United States Patent
Ohrbom et al.

(10) Patent No.: US 6,291,073 B1
(45) Date of Patent: *Sep. 18, 2001

(54) CURABLE COATING COMPOSITION WITH IMPROVED STABILITY

(75) Inventors: Walter H Ohrbom, Hartland Township; Paul J. Harris, West Bloomfield, both of MI (US)

(73) Assignee: BASF Corporation, Southfield, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/429,447

(22) Filed: Oct. 28, 1999

(51) Int. Cl.$^7$ .................. C09D 161/20; C09D 167/04
(52) U.S. Cl. .................. 428/423.1; 525/411; 525/414; 525/519; 528/260; 528/262; 528/354; 528/45; 528/84

(58) Field of Search .................. 528/260, 262, 528/354, 45, 84; 525/411, 414, 519; 428/423.1

(56) References Cited

U.S. PATENT DOCUMENTS 6,084,038 * 7/2000 Ohrbom .................. 525/481

* cited by examiner

Primary Examiner—Patricia A. Short
(74) Attorney, Agent, or Firm—Anna M. Budde

(57) ABSTRACT

The present invention provides a curable coating composition that includes at least three components. The coating composition includes a component (a) having at least one carbamate group or urea group and having a lactone or hydroxy carboxylic acid moiety. The second component (b) of the coating composition is the reaction product of a polyol having at least one branch point, i.e., carbon bonded to at least three other carbons, with a lactone or hydroxy carboxylic acid. The third component of the coating composition is a curing agent that is reactive with the first two components. Preparation of coated articles using the compositions of the invention is also disclosed.

29 Claims, No Drawings

CURABLE COATING COMPOSITION WITH IMPROVED STABILITY

FIELD OF THE INVENTION

This invention concerns curable coating compositions, especially compositions for high-gloss topcoats, particularly for clearcoats of color-plus-clear composite coatings.

BACKGROUND OF THE INVENTION

Curable, or thermosettable, coating compositions are widely used in the coatings art, particularly for topcoats in the automotive and industrial coatings industry. Color-plus-clear composite coatings are particularly useful as topcoats for which exceptional gloss, depth of color, distinctness of image, or special metallic effects are desired. The automotive industry has made extensive use of these coatings for automotive body panels.

Single-layer topcoats and the clearcoats of color-plus-clear composite coatings, however, require an extremely high degree of clarity and gloss to achieve the desired visual effect. Such coatings also require a low degree of visual aberrations at the surface of the coating in order to achieve the desired visual effect such as high distinctness of image (DOI). As such, these coatings are especially susceptible to a phenomenon known as environmental etch. Environmental etch manifests itself as spots or marks on or in the finish of the coating that often cannot be rubbed out. It is often difficult to predict the degree of resistance to environmental etch that a high gloss topcoat or color-plus-clear composite coating will exhibit. Many coating compositions known for their durability and/or weatherability when used in exterior paints, such as known high-solids enamels, do not provide the desired level of resistance to environmental etch when used in high gloss coatings such as the clearcoat of a color-plus-clear composite coating.

Curable coating compositions utilizing carbamate- or urea-functional materials are described, for example, in U.S. Pat. Nos. 5,756,213; 5,760,127; 5,770,650, 5,792,810; and 5,827,930, each of which is incorporated herein by reference. These patents describe coating compositions including a carbamate-functional or urea-functional compound prepared by a ring-opening reaction with a lactone. While such compounds have proven useful in coatings, particularly coatings for flexible substrates, it has been found that even a modest number of lactone units in the compounds give rise to problems of solidification during storage at room temperature and the need to employ higher amounts of solvent than desired in order to obtain suitable viscosities. On the other hand, decreasing the average number of lactone units per compound leads to less than optimum properties in the cured coating, such as poorer durability, less resistance to environmental etch, and less resistance to scratching and marring.

SUMMARY OF THE INVENTION

The present invention provides a curable coating composition that includes at least three components: a component (a), a component (b), and a component (c). The present invention also provides a composition comprising component (a) and component (b) that has improved stability against crystallization or solidification as compared to compositions without the component (b).

The component (a) has at least one carbamate group or urea group and has a lactone or hydroxy carboxylic acid moiety. When used in connection with the invention, the term "carbamate group" refers to a group having a structure

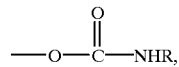

in which R is H or alkyl. Preferably, R is H or alkyl of from 1 to about 4 carbon atoms, and more preferably R is H. When used in connection with the invention, terminal urea group refers to a group having a structure

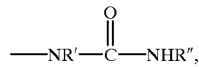

in which R' and R" are each independently H or alkyl, or R' and R" together form a heterocyclic ring structure. Preferably, R' and R" are each independently H or alkyl of from 1 to about 4 carbon atoms or together form an ethylene bridge, and more preferably R' and R" are each independently H. The terminal urea group of the invention is distinguished from urea linking groups for which R" would be other than alkyl.

Preferred compounds (a) may be represented by the structures

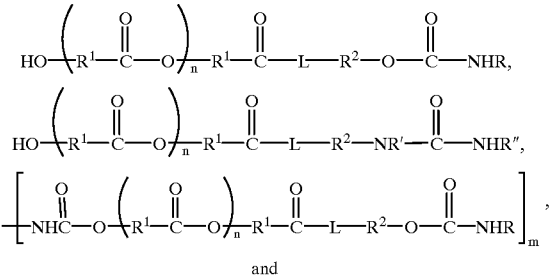

and

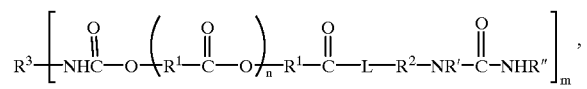

in which R, R', and R" are as previously defined; $R^1$ is alkylene or arylalkylene, preferably alkylene, and particularly preferably alkylene of 5 to 10 carbon atoms; $R^2$ is alkylene or arylalkylene, preferably alkylene and particular preferably alkylene of about 5 to about 10 carbon atoms; $R^3$ is alkylene (including cycloalkylene), alkylarylene, arylene, or a structure that includes a cyanuric ring, a urethane group, a urea group, a carbodiimide group, a biuret structure, or an allophonate group, preferably alkylene (including cycloalkylene) or a structure that includes a cyanuric ring; n is from 1 to about 10, preferably from 1 to about 5; m is from 2 to about 6, preferably 2 or 3; and L is O, NH, or $NR^4$, where $R^4$ is an alkyl, preferably an alkyl of 1 to about 6 carbon atoms.

The compound (a) may be prepared by a process that involves a step of reacting together a lactone or a hydroxy carboxylic acid and a compound comprising a carbamate or urea group or a group that can be converted to a carbamate or urea group and a group that is reactive with the lactone or hydroxy carboxylic acid. In the case of a group that can be converted to a carbamate or urea group, the group is converted to the carbamate or urea group either during or after the reaction with the lactone or hydroxy carboxylic acid. The process for preparing compound (a) may include a further step in which a hydroxyl-functional product of the first step is reacted with a compound having at least two isocyanate groups.

The second component (b) is a branched polyol having a lactone or hydroxy carboxylic acid moiety. The branched polyol has at least two hydroxyl groups and at least one branch point. By "branch point" we mean a carbon atom having carbon-carbon bonds with at least three other carbon atoms. Preferred compounds of the second component (b) may be represented by the structure

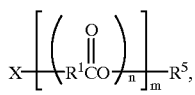

in which $R^1$, n, and m are as previously defined, $R^5$ is an m-valent moiety having at least one branch point, and X is a moiety having an active hydrogen group. Preferably, $R^5$ is alkylene, more preferably with one branch point, and particularly preferably $R^5$ has from 2 to about 12 carbon atoms. Preferably, X is OH or X is a moiety having a carbamate or terminal urea group, more preferably X is OH.

The third component (c) of the coating composition is a curing agent that is reactive with the first two components.

Additionally, the invention provides a process for increasing the solids content of a coating composition that includes a component (a) as described above having at least one carbamate group or urea group and having a lactone or hydroxy carboxylic acid moiety. In the process of the invention, a small amount of a polyol (b)(1) having at least one branch point, preferably from about 0.2 to about 10% by weight based on the total weight of the components (a) and (b), is incorporated into the composition, preferably during a step in which a compound (a)(1) is reacted with a lactone or hydroxy carboxylic acid to form the component (a). Preferred polyols (b)(1) may be represented by the structure $R^5(OH)_m$, where $R^5$ and m are as defined previously.

The invention further provides an article having a substrate, in particular a flexible substrate, upon which substrate is a cured coating derived from a coating composition according to the invention and a method of producing such a coating on a substrate.

DETAILED DESCRIPTION

The composition according to the present invention includes as a first component a compound (a) having at least one carbamate group or terminal urea group and having a lactone or hydroxy acid moiety. By "lactone or hydroxy acid moiety" it is meant a structure resulting from incorporation of a lactone or hydroxy acid into the compound. For example, a lactone or hydroxy acid could be incorporated into compound (a) as an ester or polyester segment by reaction with a hydroxyl or a primary or secondary amine group on a precursor to compound (a). Preferred compounds (a) may be represented by the structures

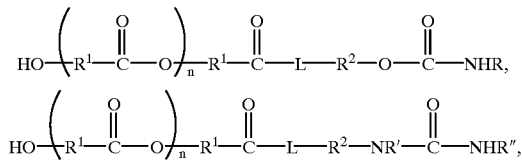

-continued

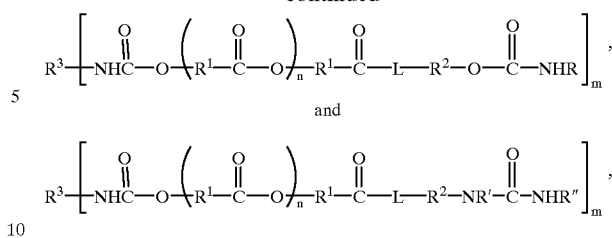

in which R, R', and R" are as previously defined; $R^1$ is alkylene or arylalkylene, preferably alkylene, and particularly preferably alkylene of 5 to 10 carbon atoms; $R^2$ is alkylene or arylalkylene, preferably alkylene and particular preferably alkylene of about 5 to about 10 carbon atoms; $R^3$ is alkylene (including cycloalkylene), alkylarylene, arylene, or a structure that includes a cyanuric ring, a urethane group, a urea group, a carbodiimide group, a biuret structure, or an allophonate group, preferably alkylene (including cycloalkylene) or a structure that includes a cyanuric ring; n is from 1 to about 10, preferably from 1 to about 5; m is from 2 to about 6, preferably 2 or 3; and L is O, NH, or $NR^4$, where $R^4$ is an alkyl, preferably an alkyl of 1 to about 6 carbon atoms.

The compound (a) may be prepared by a process that involves a step of reacting together a lactone or a hydroxy carboxylic acid and a compound (a)(1) comprising a carbamate or terminal urea group or a group that can be converted to a carbamate or terminal urea group and a group that is reactive with the lactone or hydroxy carboxylic acid. Preferably, the compound (a)(1) has a carbamate or terminal urea group or, in an alternative preferred embodiment, it has a carbamate group or a group that can be converted to a carbamate group. In a particularly preferred embodiment, the compound (a)(1) has a carbamate group.

Suitable functional groups reactive with the lactone or hydroxyl carboxylic acid include, without limitation, hydroxyl groups, carboxyl groups, isocyanate groups, and primary and secondary amine groups. Preferably, the compound (a)(1) has a hydroxyl group or an amino group as the group reactive with the lactone or hydroxyl carboxylic acid. The compound (a)(1) has at least one group that is reactive with the lactone or hydroxyl carboxylic acid, and preferably it has from 1 to about 3 of such groups, and more preferably it has one such reactive group. In a preferred embodiment, the compound (a)(1) has a carbamate group and a hydroxyl group. One preferred example of such a compound is a hydroxyalkyl carbamate, particularly a β-hydroxyalkyl carbamate. In another preferred embodiment, the compound (a)(1) has a terminal urea group and a hydroxyl group.

Suitable compounds (a)(1) include, without limitation, any of those compounds having a carbamate or terminal urea group and a group reactive with lactone or hydroxyl carboxylic acid that are known in the art. Hydroxypropyl carbamate and hydroxyethyl ethylene urea, for example, are well known and commercially available. Amino carbamates are described in U.S. Pat. No. 2,842,523. Hydroxyl ureas may also be prepared by reacting the amine group of an amino alcohol with hydrochloric acid and then urea to form a hydroxy urea compound. An amino alcohol can be prepared, for example, by reacting an oxazolidone with ammonia. Amino ureas can be prepared, for example, by reacting a ketone with a diamine having one amine group protected from reaction (e.g., by steric hindrance), followed by reaction with HNCO (e.g., as generated by thermal decomposition of urea), and finally reaction with water. Alternatively, these compounds can be prepared by starting with a compound having the group that can be converted to carbamate or terminal urea, which groups are described below, and converting that group to the carbamate or urea prior to beginning the reaction with the lactone or hydroxy carboxylic acid.

In a particularly preferred embodiment, the compound (a) is prepared by a process that involves a step of reacting together a lactone or a hydroxy carboxylic acid and the compound (a)(1) in the presence of a minor amount of a compound (b)(1). The compound (b)(1) is a polyol that may be represented by the structure $R^5(OH)_m$, where $R^5$, n, and m are as defined previously.

The compound (b) is included in an amount that is sufficient to stabilize the composition including components (a) and (b) for a period of time of at least about six months. In particular, the compound (b) is included in an amount that is sufficient to prevent the solidification at about 20° C. of the component (a) for at least about six months. Component (b) is included in an amount sufficient to keep component (a) fluid for at least about six months. If, during the at least six-month period the mixture including components (a) and (b) is cooled to a temperature below about 0° C. at which temperature the mixture solidifies, then when heated again to about 20° C., the mixture should again liquefy.

In another aspect of the invention, the preparation of compound (a) includes a further step in which the product of the reaction of compound (a)(1) is reacted with the lactone or carboxylic acid with a polyisocyanate. Preferably, the product of compound (a)(1) and the lactone or hydroxy carboxylic acid has a hydroxyl group at the end of the lactone or hydroxy carboxylic acid segment that is reacted with the polyisocyanate. Suitable examples of polyisocyanate compounds include both aliphatic polyisocyanates and aromatic polyisocyanates. Useful polyisocyanates include monomeric isocyanates, for example aliphatic diisocyanates such as ethylene diisocyanate, 1,2-diisocyanatopropane, 1,3-diisocyanatopropane, 1,6-diisocyanatohexane (hexamethylene diisocyanate or HMDI), 1,4-butylene diisocyanate, lysine diisocyanate, 1,4-methylene bis-(cyclohexyl isocyanate) and isophorone diisocyanate (IPDI), and aromatic diisocyanates and arylaliphatic diisocyanates such as the various isomers of toluene diisocyanate, meta-xylylenediioscyanate and para-xylylenediisocyanate, 4-chloro-1,3-phenylene diisocyanate, 1,5-tetrahydro-naphthalene diisocyanate, 4,4'-dibenzyl diisocyanate, and 1,2,4-benzene triisocyanate. In addition, the various isomers of α, α, α', α'-tetramethyl xylylene diisocyanate can be used. Isocyanate-functional oligomers or low molecular weight reaction products of the monomeric isocyanates, which may have from 2 to about 6 isocyanate groups, may also be used. Examples of these include isocyanurates and the reaction products of excess isocyanate with polyols, such as the product of three moles of diisocyanate with a mole of a triol (e.g., 3 moles of IPDI with one mole of trimethylolpropane or two moles of IPDI with one mole of neopentyl glycol); reaction products of isocyanate with urea (biurets); and reaction products of isocyanate with urethane (allophanates). The polyisocyanate preferably has two to four isocyanate groups, and more preferably the polyisocyanate has 2 or 3 isocyanate groups per molecule. Isocyanurates such as the isocyanurates of isophorone diisocyanate or hexamethylene diisocyanate are particularly preferred. In a particularly preferred embodiment, a β-hydroxyalkyl carbamate is reacted with epsilon-caprolactone and the product of this reaction is then reacted with a polyisocyanate, preferably the isocyanurate of IPDI. It should be appreciated that the order of the various reaction steps may in many cases be varied in the synthesis of the compounds of the invention.

When a compound (a)(1) that has a group that can be converted to carbamate or terminal urea is used, conversion of the group to a carbamate or urea can be accomplished during or after the reaction with the lactone or the hydroxy carboxylic acid to produce the first component. Groups that can be converted to carbamate include cyclic carbonate groups, epoxy groups, and unsaturated bonds. Cyclic carbonate groups can be converted to carbamate groups by reaction with ammonia or a primary amine, which ring-opens the cyclic carbonate to form a β-hydroxy carbamate. Epoxy groups can be converted to carbamate groups by first converting to a cyclic carbonate group by reaction with $CO_2$. This can be done at any pressure from atmospheric up to supercritical $CO_2$ pressures, but is preferably under elevated pressure (e.g., 60–150 psi). The temperature for this reaction is preferably 60°–150° C. Useful catalysts include any that activate an oxirane ring, such as tertiary amine or quaternary salts (e.g., tetramethyl ammonium bromide), combinations of complex organotin halides and alkyl phosphonium halides (e.g., $(CH_3)_3SnI$, $Bu_4SnI$, $Bu_4PI$, and $(CH_3)_4PI$), potassium salts (e.g., $K_2CO_3$, KI) preferably in combination with crown ethers, tin octoate, calcium octoate, and the like. The cyclic carbonate group can then be converted to a carbamate group as described above. Any unsaturated bond can be converted to a carbamate group by first reacting with peroxide to convert to an epoxy group, then with $CO_2$ to form a cyclic carbonate, and then with ammonia or a primary amine to form the carbamate.

Other groups, such as hydroxyl groups or isocyanate groups can also be converted to carbamate groups. However, if such groups were to be present on the compound (a)(1) and it is desired to convert those groups to carbamate after the reaction with the lactone or hydroxycarboxylic acid, they would have to be blocked or protected so that they would not react during the lactone reaction. When blocking these groups is not feasible, the conversion to carbamate or terminal urea would have to be completed prior to the lactone reaction. Hydroxyl groups can be converted to carbamate groups by reaction with a monoisocyanate (e.g., methyl isocyanate) to form a secondary carbamate group (that is, a carbamate of the structure above in which R is alkyl) or with cyanic acid (which may be formed in situ by thermal decomposition of urea) to form a primary carbamate group (i.e., R in the above formula is H). This reaction preferably occurs in the presence of a catalyst as is known in the art. A hydroxyl group can also be reacted with phosgene and then ammonia to form a primary carbamate group, or by reaction of the hydroxyl with phosgene and then a primary amine to form a compound having secondary carbamate groups. Another approach is to react an isocyanate with a compound such as hydroxyalkyl carbamate to form a carbamate-capped isocyanate derivative. For example, one isocyanate group on toluene diisocyanate can be reacted with hydroxypropyl carbamate, followed by reaction of the other isocyanate group with an excess of polyol to form a hydroxy carbamate. Finally, carbamates can be prepared by a transesterification approach where a hydroxyl group is reacted with an alkyl carbamate (e.g., methyl carbamate, ethyl carbamate, butyl carbamate) to form a primary carbamate group-containing compound. This reaction is performed at elevated temperatures, preferably in the presence of a catalyst such as an organometallic catalyst (e.g., dibutyltin dilaurate). Other techniques for preparing carbamates are also known in the art and are described, for example, in P. Adams & F. Baron, "Esters of Carbamic Acid", *Chemical Review*, v. 65, 1965 and in U.S. Pat. No. 5,474,811, issued to Rehfuss and St. Aubin.

Groups such as oxazolidone can also be converted to terminal urea after reaction with the lactone or hydroxy carboxylic acid. For example, hydroxyethyl oxazolidone can be used to react with the lactone or hydroxy carboxylic acid, followed by reaction of ammonia or a primary amine with the oxazolidone to generate the urea functional group.

One preferred class of compounds (a)(1) having a group reactive with the lactone or hydroxy carboxylic acid and a group that can be converted to carbamate is the hydroxyalkyl cyclic carbonates. Hydroxyalkyl cyclic carbonates can be prepared by a number of approaches.

Certain hydroxyalkyl cyclic carbonates like 3-hydroxypropyl carbonate (i.e., glycerine carbonate) are commercially available. Cyclic carbonate compounds can be synthesized by any of several different approaches. One approach involves reacting an epoxy group-containing compound with $CO_2$ under conditions and with catalysts as described hereinabove. Epoxides can also be reacted with β-butyrolactone in the presence of such catalysts. In another approach, a glycol like glycerine is reacted at temperatures of at least 80° C. with diethyl carbonate in the presence of a catalyst (e.g., potassium carbonate) to form a hydroxyalkyl carbonate. Alternatively, a functional compound containing a ketal of a 1,2-diol having the structure:

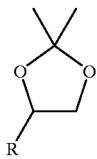

can be ring-opened with water, preferably with a trace amount of acid, to form a 1,2-glycol, the glycol then being further reacted with diethyl carbonate to form the cyclic carbonate.

Cyclic carbonates typically have 5- or 6-membered rings, as is known in the art. Five-member rings are preferred, due to their ease of synthesis and greater degree of commercial availability. Six-membered rings can be synthesized by reacting phosgene with 1,3-propanediol under conditions known in the art for the formation of cyclic carbonates. Preferred hydroxyalkyl cyclic carbonates used in the practice of the invention can be represented by the formula:

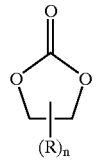

in which R (or each instance of R if n is more than 1) is a hydroxyalkyl group of 1–18 carbon atoms, preferably 1–6 carbon atoms, and more preferably 1–3 carbon atoms, which may be linear or branched and may have substituents in addition to the hydroxyl group, and n is 1 or 2, which may be substituted by one or more other substituents such as blocked amines or unsaturated groups. The hydroxyl group may be on a primary, secondary, or tertiary carbon. More preferably, R is —$(CH_2)_p$—OH, where the hydroxyl may be on a primary or secondary carbon and p is 1 to 8, and even more preferably in which the hydroxyl is on a primary carbon and p is 1 or 2.

The compound (a)(2) may be a lactone or a hydroxy carboxylic acid. Lactones that can be ring opened by an active hydrogen are well-known in the art. They include, for example, ε-caprolactone, γ-caprolactone, β-butyrolactone, β-propriolactone, γ-butyrolactone, α-methyl-γ-butyrolactone, β-methyl-γ-butyrolactone, γ-valerolactone, δ-valerolactone, γ-nonanoic lactone, γ-octanoic lactone, and pentolactone. In one preferred embodiment, the lactone is ε-caprolactone. Lactones useful in the practice of the invention can also be characterized by the formula:

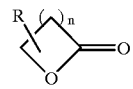

wherein n is a positive integer of 1 to 7 and R is one or ore H atoms, or substituted or unsubstituted alkyl groups of 1–7 carbon atoms.

The lactone ring-opening reaction is typically conducted under elevated temperature (e.g., 80–150° C.). The reactants are usually liquids so that a solvent is not necessary. However, a solvent may be useful in promoting good conditions for the reaction even if the reactants are liquid. Any non-reactive solvent may be used, including both polar and nonpolar organic solvents. Examples of useful solvents include toluene, xylene, methyl ethyl ketone, methyl isobutyl ketone, and the like. A catalyst is preferably present. Useful catalysts include proton acids (e.g., octanoic acid, Amberlyst® 15 (Rohm & Haas)), and tin catalysts (e.g., stannous octoate). Alternatively, the reaction can be initiated by forming a sodium salt of the hydroxyl group on the molecules that react will react with the lactone ring.

A hydroxy carboxylic acid can also be used as compound (a)(2). Useful hydroxy carboxylic acids include dimethyl-hydroxypropionic acid, hydroxy stearic acid, tartaric acid, lactic acid, 2-hydroxyethyl benzoic acid, and N-(2-hydroxyethyl)ethylene diamine triacetic acid. The reaction can be conducted under typical esterification conditions, for example at temperatures from room temperature up to about 150° C., and with catalysts such as calcium octoate, metal hydroxides like potassium hydroxide, Group I or Group II metals such as sodium or lithium, metal carbonates such as potassium carbonate or magnesium carbonate (which may be enhanced by use in combination with crown ethers), organometallic oxides and esters such as dibutyl tin oxide, stannous octoate, and calcium octoate, metal alkoxides such as sodium methoxide and aluminum tripropoxide, protic acids like sulfuric acid, or $Ph_4SbI$. The reaction may also be conducted at room temperature with a polymer-supported catalyst such as Amerlyst-15® (available from Rohm & Haas) as described by R. Anand in *Synthetic Communications*, 24(19), 2743–47 (1994), the disclosure of which is incorporated herein by reference. The reaction may be performed with an excess of the compound having the group reactive with the hydroxy carboxylic acid.

The reaction with the compound (a)(2) can provide chain extension of the compound (a)(1) molecule if sufficient amounts of the compound (a)(2) are present. The relative amounts of the (a)(1) compound and the (a)(2) lactone and/or hydroxy acid can be varied to control the degree of chain extension. The reaction of the lactone ring or of the hydroxy carboxylic acid with a hydroxyl or amine group results in the formation of an ester or amide and an OH group. The resulting OH group can then react with another available lactone ring or molecule of hydroxy carboxylic acid, thus resulting in chain extension. The reaction is thus controlled by the proportion of the compound(s) (a)(2) to the amount of initiator compound (a)(1). In the preferred embodiments of the present invention, the ratio of equivalents of lactone and/or hydroxy carboxylic acid to equivalents of active hydrogen groups on compound (a)(1) is preferably from 0.1:1 to 10:1, and more preferably from 1:1 to 5:1. When the reaction product has an acid group, the acid group can then be converted to a hydroxyl group by well-known techniques such as reaction with ethylene oxide.

The coating composition further includes a component (b). Component (b) can be prepared according to the process outlined above in which compound (a)(1) are polyol (b)(1) are simultaneously reacted with the lactone or hydroxy carboxylic acid compound (a)(2). Alternatively, the components (a) and (b) can be formed separately and combined in the coating composition.

The compound (b) may be prepared by a process including a step of reacting together a compound (b)(2) that is a lactone or a hydroxy carboxylic acid with a compound (b)(1). The compound (b)(1) is a polyol having at least one branch point. Examples of suitable lactones and hydroxy carboxylic acids include those already mentioned above. Examples of polyols suitable as the compound (b)(1) include, without limitation, neopentyl glycol, 2-ethyl-1,3-hexanediol, 2,5-dimethyl-2,5-hexanediol, 2,2,4-trimethyl-1,3-pentanediol, 2,2-diethyl-1,3-propanediol, 2-methyl-2-propyl-1,3-propanediol, 2,4-dimethyl-2,4-pentanediol, 3,3-dimethyl-1,2-butanediol, 1-ethyl-2-propyl-1,5-pentanediol, 2-ethyl-2-methyl-1,3-propanediol, 2-methyl-2,4-pentanediol, 1,2-cyclohexanedimethanol, 1,4-cylcohexanedimethanol, and so on. Particularly preferred are 2-ethyl-1,3-hexanediol, 2,2,4-trimethyl-1,3-pentanediol, 2-ethyl-2-methyl-1,3-propanediol, and 1-ethyl-2-propyl-1,5-pentanediol.

The amount of polyol (b)(1) having at least one branch point is preferably from about 0.2 to about 10% by weight based on the total weight of the components (a) and (b).

Component (b) preferably has a structure

in which $R^1$, n, and m are as previously defined, $R^5$ is an m-valent moiety having at least one branch point, and X is a moiety having an active hydrogen group. Preferably, $R^5$ is alkylene or substituted alkylene, more preferably with one branch point, and preferably $R^5$ has from 2 to about 12 carbon atoms. Preferably, X is OH or X is a moiety having a carbamate or terminal urea group, more preferably X is OH.

Compound (b)(1) may be represented by the structure $R^5$-$(OH)_m$, in which $R^5$ and m are as defined previously.

In a one preferred embodiment, the component (b) has a structure as shown above in which X is OH. In other cases, it may be advantageous to modify the hydroxyl functional compound as described in U.S. Pat. No. 5,827,930, the entire disclosure of which is incorporated herein by reference, to provide a component (b) that has carbamate or terminal urea functionality as defined hereinabove. The hydroxyl group resulting from the reaction of the compound (b)(1) with the compound (b)(2) lactone or hydroxy carboxylic acid can be reacted with a compound (b)(3) to supply a carbamate or terminal urea functionality. Compound (b)(3) has a group that is reactive with the hydroxyl group of the of the product of the reaction of (b)(1) with (b)(2) to provide a group that will be reactive with crosslinker compound (c), preferably a carbamate or urea group or group that can be converted to carbamate or urea.

A number of compounds may be used as compound (b)(3) to convert a hydroxyl group on the product of (b)(1) and (b)(2) to a carbamate group. Hydroxyl groups can be converted to carbamate groups by reaction with a monoisocyanate such as methyl isocyanate or with cyanic acid (which may be formed by the thermal decomposition of urea) to form a primary carbamate group. A catalyst may be used. A hydroxyl group can also be reacted with phosgene and then ammonia to form a compound having primary carbamate functionality (R is hydrogen) or with phosgene and then a primary amine to form a compound having secondary carbamate functionality (R is alkyl).

In another method, alkyl carbamates such as methyl carbamate or butyl carbamate or substituted alkyl carbamates such as hydroxypropyl carbamate can be transesterified with the hydroxyl group. This reaction is carried out with heating and, preferably, in the presence of a catalyst such as an organometallic catalyst like dibutyl tin dilaurate. Additionally, a methylol acrylamide compound can be reacted with the hydroxyl group and then converted to carbamate by reaction of the unsaturated acrylamide bond with peroxide, then $CO_2$, then ammonia or a primary amine. It is also possible to react the hydroxyl with a partially blocked diisocyanate, then unblock the isocyanate and react the regenerated isocyanate group with a hydroxyalkyl carbamate or hydroxy urea (i.e., hydroxypropyl carbamate or hydroxyethyl ethylene urea). A diisocyanate in which the isocyanate groups have differing reactivities, such as toluene diisocyanate, is particularly suitable for half-blocking. Similarly, the half-blocked polyisocyanate can be reacted first with the hydroxy functional carbamate or urea compound and then unblocked and reacted with the hydroxy functional product of (b)(1) and (b)(2).

The coating composition further includes a component (c) that is a curing agent or curing agents reactive with components (a) and (b). Each curing agent should be reactive with functionality on one or both of components (a) and (b). For example, curing agent or agents of component (c) could be reactive with carbamate groups, urea groups, and/or hydroxyl groups, depending on the functionalities of components (a) and (b). Useful curing agents include materials having active methylol or methylalkoxy groups, such as aminoplast crosslinking agents or phenol/formaldehyde adducts; curing agents that have isocyanate groups, particularly blocked isocyanate curing agents, curing agents that have epoxide groups, amine groups, acid groups, siloxane groups, cyclic carbonate groups, and anhydride groups; and mixtures thereof. Examples of preferred curing agent compounds include, without limitation, melamine formaldehyde resin (including monomeric or polymeric melamine resin and partially or fully alkylated melamine resin), blocked or unblocked polyisocyanates (e.g., TDI, MDI, isophorone diisocyanate, hexamethylene diisocyanate, and isocyanurates of these, which may be blocked for example with alcohols or oximes), urea resins (e.g., methylol ureas such as urea formaldehyde resin, alkoxy ureas such as butylated urea formaldehyde resin), polyanhydrides (e.g., polysuccinic anhydride), and polysiloxanes (e.g., trimethoxy siloxane). Another suitable crosslinking agent is tris(alkoxy carbonylamino) triazine (available from Cytec Industries under the tradename TACT). The curing agent may be combinations of these, particularly combinations that include aminoplast crosslinking agents. Aminoplast resins such as melamine formaldehyde resins or urea formaldehyde resins are especially preferred. Combinations of tris(alkoxy carbonylamino) triazine with a melamine formaldehyde resin and/or a blocked isocyanate curing agent are likewise suitable and desirable.

The coating composition used in the practice of the invention may include a catalyst to enhance the cure reaction. For example, when aminoplast compounds, especially monomeric melamines, are used as a curing agent, a strong acid catalyst may be utilized to enhance the cure reaction. Such catalysts are well-known in the art and include, without limitation, p-toluenesulfonic acid, dinonylnaphthalene disulfonic acid, dodecylbenzenesulfonic acid, phenyl acid phosphate, monobutyl maleate, butyl phosphate, and hydroxy phosphate ester. Strong acid catalysts are often blocked, e.g. with an amine. Other catalysts that may be useful in the composition of the invention include Lewis acids, zinc salts, and tin salts.

A solvent may optionally be utilized in the coating composition used in the practice of the present invention. Although the composition used according to the present invention may be utilized, for example, in the form of substantially solid powder, or a dispersion, it is often desirable that the composition is in a substantially liquid state, which can be accomplished with the use of a solvent. This solvent should act as a solvent with respect to the components of the composition. In general, the solvent can be any organic solvent and/or water. In one preferred embodiment, the solvent is a polar organic solvent. More preferably, the solvent is selected from polar aliphatic solvents or polar aromatic solvents. Still more preferably, the solvent is a ketone, ester, acetate, aprotic amide, aprotic sulfoxide, aprotic amine, or a combination of any of these. Examples of useful solvents include, without limitation, methyl ethyl ketone, methyl isobutyl ketone, m-amyl acetate, ethylene glycol butyl ether-acetate, propylene glycol monomethyl ether acetate, xylene, N-methylpyrrolidone, blends of aromatic hydrocarbons, and mixtures of these. In another preferred embodiment, the solvent is water or a mixture of water with small amounts of co-solvents.

In a preferred embodiment of the invention, the solvent is present in the coating composition in an amount of from about 0.01 weight percent to about 99 weight percent, preferably from about 10 weight percent to about 60 weight percent, and more preferably from about 30 weight percent to about 50 weight percent.

Coating compositions can be coated on the article by any of a number of techniques well-known in the art. These include, for example, spray coating, dip coating, roll coating, curtain coating, and the like. For automotive body panels, spray coating is preferred.

Additional agents, for example surfactants, fillers, stabilizers, wetting agents, dispersing agents, adhesion promoters, UV absorbers, hindered amine light stabilizers, etc. may be incorporated into the coating composition. While such additives are well-known in the prior art, the amount used must be controlled to avoid adversely affecting the coating characteristics.

The coating composition according to the invention is preferably utilized in a high-gloss coating and/or as the clearcoat of a composite color-plus-clear coating. High-gloss coatings as used herein are coatings having a 20° gloss (ASTM D523) or a DOI (ASTM E430) of at least 80.

When the coating composition of the invention is used as a high-gloss pigmented paint coating, the pigment may be any organic or inorganic compounds or colored materials, fillers, metallic or other inorganic flake materials such as mica or aluminum flake, and other materials of kind that the art normally includes in such coatings. Pigments and other insoluble particulate compounds such as fillers are usually used in the composition in an amount of 1% to 100%, based on the total solid weight of binder components (i.e., a pigment-to-binder ratio of 0.1 to 1).

When the coating composition according to the invention is used as the clearcoat of a composite color-plus-clear coating, the pigmented basecoat composition may any of a number of types well-known in the art, and does not require explanation in detail herein. Polymers known in the art to be useful in basecoat compositions include acrylics, vinyls, polyurethanes, polycarbonates, polyesters, alkyds, and polysiloxanes. Preferred polymers include acrylics and polyurethanes. In one preferred embodiment of the invention, the basecoat composition also utilizes a carbamate-functional acrylic polymer. Basecoat polymers may be thermoplastic, but are preferably crosslinkable and comprise one or more type of crosslinkable functional groups. Such groups include, for example, hydroxy, isocyanate, amine, epoxy, acrylate, vinyl, silane, and acetoacetate groups. These groups may be masked or blocked in such a way so that they are unblocked and available for the crosslinking reaction under the desired curing conditions, generally elevated temperatures. Useful crosslinkable functional groups include hydroxy, epoxy, acid, anhydride, silane, and acetoacetate groups. Preferred crosslinkable functional groups include hydroxy functional groups and amino functional groups.

Basecoat polymers may be self-crosslinkable, or may require a separate crosslinking agent that is reactive with the functional groups of the polymer. When the polymer comprises hydroxy functional groups, for example, the crosslinking agent may be an aminoplast resin, isocyanate and blocked isocyanates (including isocyanurates), and acid or anhydride functional crosslinking agents.

The coating compositions described herein are preferably subjected to conditions so as to cure the coating layers. Although various methods of curing may be used, heat-curing is preferred. Generally, heat curing is effected by exposing the coated article to elevated temperatures provided primarily by radiative heat sources. Curing temperatures will vary depending on the particular blocking groups used in the cross-linking agents, however they generally range between 90° C. and 180° C. The first compounds according to the present invention are preferably reactive even at relatively low cure temperatures. Thus, in a preferred embodiment, the cure temperature is preferably between 115° C. and 150° C., and more preferably at temperatures between 115° C. and 140° C. for a blocked acid catalyzed system. For an unblocked acid catalyzed system, the cure temperature is preferably between 80° C. and 100° C. The curing time will vary depending on the particular components used, and physical parameters such as the thickness of the layers, however, typical curing times range from 15 to 60 minutes, and preferably 15–25 minutes for blocked acid catalyzed systems and 10–20 minutes for unblocked acid catalyzed systems.

The invention is further described in the following examples. The examples are merely illustrative and do not in any way limit the scope of the invention as described and claimed. All parts are parts by weight unless otherwise noted.

EXAMPLES

Example of the Invention

A mixture of 136.9 parts by weight of hydroxypropyl carbamate, 459 parts by weight of ε-caprolactone, and 1.0 parts by weight of stannous octoate was heated in a suitable reactor under an inert atmosphere to 130° C. After three hours at 130° C., 14.9 parts by weight of 2-ethyl-1,3-hexanediol, 34.8 parts by weight of ε-caprolactone, and 4.6 parts by weight of aromatic 100 solvent were added to the reactor. The reaction mixture was then held at 130° C. for an additional four hours, then cooled to room temperature.

Comparative Example

A mixture of 136.9 parts by weight of hydroxypropyl carbamate, 459 parts by weight of ε-caprolactone, and 1.0 parts by weight of stannous octoate was heated in a suitable reactor under an inert atmosphere to 130° C. After three hours at 130° C., the reaction mixture was cooled to room temperature.

Testing of Examples

The Example of the Invention and the Comparative Example were kept at room temperature. After three days, the Comparative Example solidified to a hard, waxy solid. The Example of the Invention remained liquid.

The Example of the Invention was then tested further in a freeze/thaw cycle test by storing the sample at −5° C. freezer to bring the sample to −5° C., then allowing the sample to return to room temperature. The freeze/thaw cycle was repeated nine times. Each time, the sample returned to its original liquid state without formation of any solid material.

The invention has been described in detail with reference to preferred embodiments thereof. It should be understood, however, that variations and modifications can be made within the spirit and scope of the invention.

What is claimed is:

1. A curable coating composition, comprising
   (a) a compound having at least one carbamate group or terminal urea group that is prepared by reacting together:
      (1) a compound comprising a carbamate or terminal urea group or a group that can be converted to a carbamate or terminal urea group and a group that is reactive with (a)(2) and
      (2) a lactone or a hydroxy carboxylic acid,
   (b) a compound having at least one branch point that is prepared by reacting together:
      (1) a polyol having at least one branch point and
      (2) a lactone or a hydroxy carboxylic acid, and
   (c) a curing agent that is reactive with at least one of compound (a) and component (b),
   wherein said carbamate group has a structure

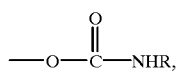

in which R is H or alkyl, and further wherein said terminal urea group has a structure

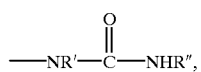

in which R' and R" are each independently H or alkyl, or R' and R" together form a heterocyclic ring structure.

2. A composition according to claim 1, wherein compound (a) has at least two carbamate groups.

3. A composition according to claim 1, wherein compound (a) has at least two functional groups selected from the group consisting of hydroxyl functional groups, carbamate functional groups, terminal urea functional groups, and combinations thereof.

4. A composition according to claim 1, wherein the preparation of compound (a) includes a further step of reacting the product of (a)(1) and (a)(2) with
   (a)(3) a polyisocyanate compound.

5. A composition according to claim 4, wherein said polyisocyanate compound is selected from the group consisting of isophorone diisocyanate, hexamethylene diisocyanate, isocyanurate of isophorone diisocyanate, isocyanurate of hexamethylene diisocyanate, and combinations thereof.

6. A composition according to claim 1, wherein the compound (a)(1) has a carbamate group.

7. A composition according to claim 1, wherein the group on compound (a)(1) that is reactive with compound (a)(2) is a hydroxyl group.

8. A composition according to claim 1, wherein compound (a)(1) has one group that is reactive with compound (a)(2).

9. A composition according to claim 1, wherein compound (a)(1) is a hydroxyalkyl carbamate.

10. A composition according to claim 9, wherein the hydroxyalkyl carbamate is a β-hydroxyalkyl carbamate.

11. A composition according to claim 1, wherein compound (a)(1) is a hydroxyalkyl cyclic carbonate.

12. A composition according to claim 1, wherein compound (a)(2) is a lactone.

13. A composition according to claim 1, wherein compound (a)(2) is ε-caprolactone.

14. A composition according to claim 12, wherein the ratio of equivalents of lactone to equivalents of the group on compound (a)(1) reactive with the lactone is from about 0.1:1 to about 10:1.

15. A composition according to claim 1, wherein compound (b)(2) is a lactone.

16. A composition according to claim 1, wherein compound (b)(2) is ε-caprolactone.

17. A composition according to claim 1, wherein compound (b)(1) is selected from the group consisting of neopentyl glycol, 2-ethyl-1,3-hexanediol, 2,5-dimethyl-2,5-hexanediol, 2,2,4-trimethyl-1,3-pentanediol, 2,2-diethyl-1,3-propanediol, 2-methyl-2-propyl-1,3-propanediol, 2,4-dimethyl-2,4-pentanediol, 3,3-dimethyl-1,2-butanediol, 1-ethyl-2-propyl-1,5-pentanediol, 2-ethyl-2-methyl-1,3-propanediol, 2-methyl-2,4-pentanediol, 1,2-cyclohexanedimethanol, 1,4-cylcohexanedimethanol, and combinations thereof.

18. A composition according to claim 1, wherein compound (b)(1) is selected from the group consisting of 2-ethyl-1,3-hexanediol, 2,2,4-trimethyl-1,3-pentanediol, 2-ethyl-2-methyl-1,3-propanediol, 1-ethyl-2-propyl-1,5-pentanediol, and combinations thereof.

19. A composition according to claim 1, wherein preparation of component (b) includes a further step of reacting the product of (b)(1) and (b)(2) with
   (b)(3) a compound having a group that is reactive with a hydroxyl group of the of the product of the reaction of (b)(1) with (b)(2),
   wherein compound (b)(3) provides a group reactive with component (c).

20. A composition according to claim 1, wherein said group provided by compound (b)(3) is a carbamate or terminal urea group.

21. A composition according to claim 1, wherein component (c) includes a melamine formaldehyde resin.

22. A composition according to claim 1, wherein R and R" are each H.

23. A composition according to claim 1, wherein the composition is a clearcoat coating composition.

24. A composition according to claim 1, further comprising a pigment.

25. A composition according to claim 1, wherein the amount of (b)(1) is from about 0.2 to about 10% by weight based on the total weight of the components (a) and (b).

26. An article comprising a substrate having thereon a cured coating derived from a coating composition according to claim 1.

27. A composition, comprising (a) a compound selected from the group consisting of compounds having structures

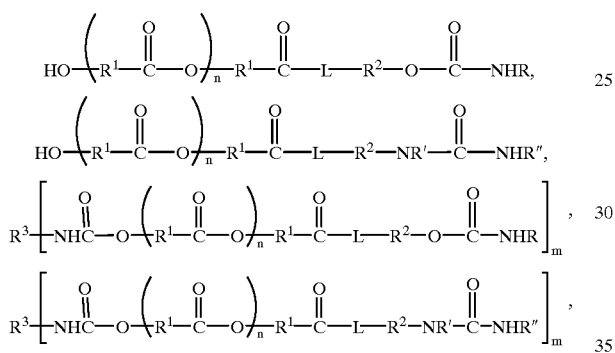

and combinations thereof;

(b) a compound having a structure:

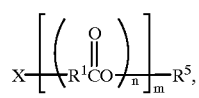

and mixtures thereof, wherein R, R' and R" are each independently H or alkyl, or R' and R" together form a heterocyclic ring structure; $R^1$, $R^2$ are alkylene or arylalkylene; $R^3$ is alkylene, alkylarylene, arylene, or a structure that includes a cyanuric ring, a urethane group, a urea group, a carbodiimide group, a biuret structure, or an allophonate group; n is from 1 to about 10; m is from 2 to about 6; and L is O, NH, or $NR^4$, where $R^4$ is an alkyl; $R^5$ is an m-valent moiety having at least one branch point; and X is a moiety having an active hydrogen group.

28. A composition according to claim 27, wherein R, R' and R" are each H; $R^1$ and $R^2$ are each alkylene of 5 to 10 carbon atoms; $R^3$ is alkylene or a structure that includes a cyanuric ring; n is from 1 to about 5; m is 2 or 3; L is O, NH, or $NR^4$, where $R^4$ is an alkyl of 1 to about 6 carbon atoms; $R^5$ has from 2 to about 12 carbon atoms; and X is OH.

29. A composition, comprising:

(a) a compound having at least one carbamate group or terminal urea group that is prepared by reacting together:
  (1) a compound comprising a carbamate or terminal urea group or a group that can be converted to a carbamate or terminal urea group and a group that is reactive with (a)(2) and
  (2) a lactone or a hydroxy carboxylic acid, and (b) a compound having at least one branch point that is prepared by reacting together:
  (1) a polyol having at least one branch point and
  (2) a lactone or a hydroxy carboxylic acid.

* * * * *